United States Patent
Chuang et al.

(10) Patent No.: US 10,367,553 B2
(45) Date of Patent: Jul. 30, 2019

(54) TRANSMISSION SCHEME FOR WIRELESS COMMUNICATION SYSTEMS

(71) Applicant: MEDIATEK INC., Hsinchu (TW)

(72) Inventors: Chiao Yao Chuang, Hsinchu (TW); Song Jheng Lin, Hsinchu (TW); Yih-Shen Chen, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/927,216

(22) Filed: Mar. 21, 2018

(65) Prior Publication Data
US 2018/0279352 A1    Sep. 27, 2018

Related U.S. Application Data

(60) Provisional application No. 62/475,949, filed on Mar. 24, 2017.

(51) Int. Cl.
*H04B 7/0456* (2017.01)
*H04W 72/12* (2009.01)
(Continued)

(52) U.S. Cl.
CPC ......... *H04B 7/0456* (2013.01); *H04B 7/0473* (2013.01); *H04B 7/0697* (2013.01); *H04L 5/0048* (2013.01); *H04W 72/042* (2013.01); *H04W 72/1231* (2013.01); *H04W 72/1289* (2013.01)

(58) Field of Classification Search
CPC ... H04W 52/32; H04W 52/325; H04W 72/12; H04W 72/1278; H04W 72/1289; H04W 72/042; H04B 7/0456
See application file for complete search history.

(56) References Cited

U.S. PATENT DOCUMENTS

| 2011/0317748 A1 | 12/2011 | Li et al. ................. 375/219 |
| 2012/0207119 A1 | 8/2012 | Zhang et al. ............ 370/329 |

(Continued)

FOREIGN PATENT DOCUMENTS

| CN | 105191392 B | 3/2013 |
| EP | 2555482 A2 | 8/2011 |

(Continued)

OTHER PUBLICATIONS

International Search Report and Written Opinion of International Search Authority for PCT/CN2018/080211 dated Jun. 8, 2018 (10 pages).

(Continued)

*Primary Examiner* — Ashley Shivers
(74) *Attorney, Agent, or Firm* — Imperium Patent Works; Zheng Jin (57) ABSTRACT

A method of two-layer (Rank=2) demodulation reference signal (DMRS) based transmission scheme is proposed. The precoding matrix on a data RE can be represented as A×B. The precoding matrix on the UE-specific reference signal DMRS is A. Matrix B is the co-phasing cycling matrix. By applying the proposed co-phasing cycling matrix B for Rank=2 DMRS-based transmission scheme, the ratio of PDSCH EPRE to DMRS EPRE is equal to 0 dB, as required by the LTE specification. Further, when the DMRS power follows the precoding matrix A, UE channel estimation performance is improved.

20 Claims, 4 Drawing Sheets

(51) Int. Cl.
*H04W 72/04* (2009.01)
*H04B 7/06* (2006.01)
*H04L 5/00* (2006.01)

(56) References Cited

U.S. PATENT DOCUMENTS

| | | | |
|---|---|---|---|
| 2013/0034180 A1 | 2/2013 | Liu et al. .................. | 375/267 |
| 2013/0070732 A1* | 3/2013 | Noh ................. | H04L 5/0016 |
| | | | 370/335 |
| 2013/0107746 A1 | 5/2013 | Wang et al. ............... | 370/252 |
| 2013/0343299 A1 | 12/2013 | Sayana et al. .............. | 370/329 |
| 2014/0241476 A1 | 8/2014 | Murakami et al. .......... | 375/347 |
| 2015/0365145 A1 | 12/2015 | Schober et al. ............. | 375/267 |
| 2015/0372740 A1 | 12/2015 | Ko et al. .................... | 370/329 |
| 2016/0094326 A1* | 3/2016 | Moon ................ | H04L 5/0026 |
| | | | 370/330 |
| 2017/0094668 A1* | 3/2017 | Tsai ................... | H04B 7/0619 |
| 2017/0134080 A1* | 5/2017 | Rahman ............. | H04B 7/0456 |
| 2018/0279365 A1* | 9/2018 | Wang ............... | H04W 74/0808 |

FOREIGN PATENT DOCUMENTS

| | | |
|---|---|---|
| EP | 2958250 A1 | 7/2014 |
| KR | 20150031242 A | 6/2012 |
| WO | WO2011062066 A1 | 11/2009 |
| WO | WO2012006005 A2 | 6/2010 |

OTHER PUBLICATIONS

Taiwan IPO, office action for the TW patent application 107110034 (no English translation is available) dated Apr. 9, 2019 (3 pages).

* cited by examiner

TRANSMISSION SCHEME FOR WIRELESS COMMUNICATION SYSTEMS

CROSS REFERENCE TO RELATED APPLICATIONS

This application claims priority under 35 U.S.C. § 119 from U.S. Provisional Application No. 62/475,949, entitled "Transmission Scheme for Wireless Communication Systems," filed on Mar. 24, 2017, the subject matter of which is incorporated herein by reference.

TECHNICAL FIELD

The disclosed embodiments relate generally to mobile communication networks, and, more particularly, to methods for applying proper precoding matrix to improve channel estimation performance.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

Spatial multiplexing is a transmission technique in multiple-input multiple-output (MIMO) wireless communication to transmit independent and separately encoded data signals called streams, from each of the multiple transmit antennas. Therefore, the space dimension is reused, or multiplexed more than one time. If the transmitter is equipped with $N_t$ antennas and the receiver has $N_r$ antennas, the maximum spatial multiplexing order (the number of streams) is $N_s = \min(N_t, N_r)$ if a linear receiver is used. This means that $N_s$ streams can be transmitted in parallel, ideally leading to an $N_s$ increase of the spectral efficiency.

In a semi-open-loop MIMO system with $N_t$ transmitter antennas and $N_r$ receiver antennas, the input-output relationship can be described as $y_i = H_i W_i x_i + n_i$, where $i$ is the resource element (RE) index, $y_i$, $x_i$, $n_i$ are the ($N_r \times 1$) vectors of the received symbols, the transmitted symbols, and noise, $H_i$ is the ($N_r \times N_t$) matrix of channel coefficients, and $W_i$ is the ($N_t \times N_s$) linear precoding matrix on the i-th RE. A precoding matrix is used to precode the symbols to enhance the performance. When the precoding matrix on the reference signal RE is the same as that on the data RE in a resource block, the precoding matrix is transparent to the UE and therefore the UE doesn't need to know W. On the other hand, the data RE can be assigned the precoding matrix that is different from the one on the reference signal in a resource block. For example, in a resource block, the precoding matrix on the reference signal is W, and the precoding matrix on the data RE is $WU_i$. Then $U_i$ should be specified for each RE index and is non-transparent to the UE.

In LTE systems, a two-stage codebook has been defined for the precoding matrix. The precoding matrix to be applied to the data RE is represented by equation (1) below, and the precoding matrix on the reference signal (RS) which is transparent to the UE becomes equation (2), and equation (3) is the co-phasing cycling matrix for the data RE.

$$\frac{1}{\sqrt{2P}} \begin{bmatrix} v_{l,m} & 0 \\ 0 & v_{l,m} \end{bmatrix} \begin{bmatrix} 1 & 1 \\ \varphi_n & -\varphi_n \end{bmatrix} \quad (1)$$

$$\frac{1}{\sqrt{2P}} \begin{bmatrix} v_{l,m} & 0 \\ 0 & v_{l,m} \end{bmatrix} \quad (2)$$

$$\begin{bmatrix} 1 & 1 \\ \varphi_n & -\varphi_n \end{bmatrix} \quad (3)$$

LTE has defined different transmission mode (TM) for different transmission scenarios. For transmission mode 9 or 10, up to 8 layers transmission is supported with UE-specific reference signal, e.g., demodulation reference signal (DMRS). For DMRS-based TM, the UE maps assume the ratio of physical downlink share channel (PDSCH) energy per resource element (EPRE) to UE-specific RS EPRE within each OFDM symbol containing UE-specific RS is 0 dB for the number of transmission layers less than or equal to two. However, based on the precoding matrix on the data RE (equation (1)), and the precoding matrix on the UE-specific RS (equation (2)), the PDSCH EPRE to UE-specific RS EPRE ratio is 3 dB, which violates the specification of 0 dB. Also, when the DMRS power is lower, it will impact the channel estimation performance at the receiver.

A solution is sought.

SUMMARY

A method of two-layer (Rank=2) demodulation reference signal (DMRS) based transmission scheme is proposed. The precoding matrix on a data RE can be represented as A×B. The precoding matrix on the UE-specific reference signal DMRS is A. Matrix B is the co-phasing cycling matrix. By applying the proposed co-phasing cycling matrix B for Rank=2 DMRS-based transmission scheme, the ratio of PDSCH EPRE to DMRS EPRE is equal to 0 dB, as required by the LTE specification. Further, when the DMRS power follows the precoding matrix A, UE channel estimation performance is improved.

In one embodiment, a BS transmits scheduling information to a user equipment (UE) for downlink transmission in a wireless communication network. The BS transmits a UE-specific reference signal applied with a first precoding matrix. The UE-specific resource signal is a demodulation reference signal (DMRS) configured for the UE and transmitted over predefined DMRS resource elements (REs). The BS transmits a data signal over data REs applied with a second precoding matrix. The second precoding matrix can be represented by the first precoding matrix multiplies multiplied by a co-phasing cycling matrix such that a ratio of an energy per resource element (EPRE) of data REs to an EPRE of the DMRS REs is 0 dB.

In another embodiment, a UE receiving scheduling information from a serving base station for downlink transmission in a wireless communication network. The UE performs channel estimation by measuring a UE-specific reference signal applied with a first precoding matrix. The UE-specific resource signal is a demodulation reference signal (DMRS) transmitted over predefined DMRS resource elements (REs). The UE receives and decodes a data signal over data REs applied with a second precoding matrix. The second precoding matrix can be represented by the first precoding matrix multiplied by a co-phasing cycling matrix. Finally, the UE derives the data signal by using the co-phasing cycling matrix such that a ratio of an energy per resource element (EPRE) of the data REs to an EPRE of the DMRS REs is 0 dB.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
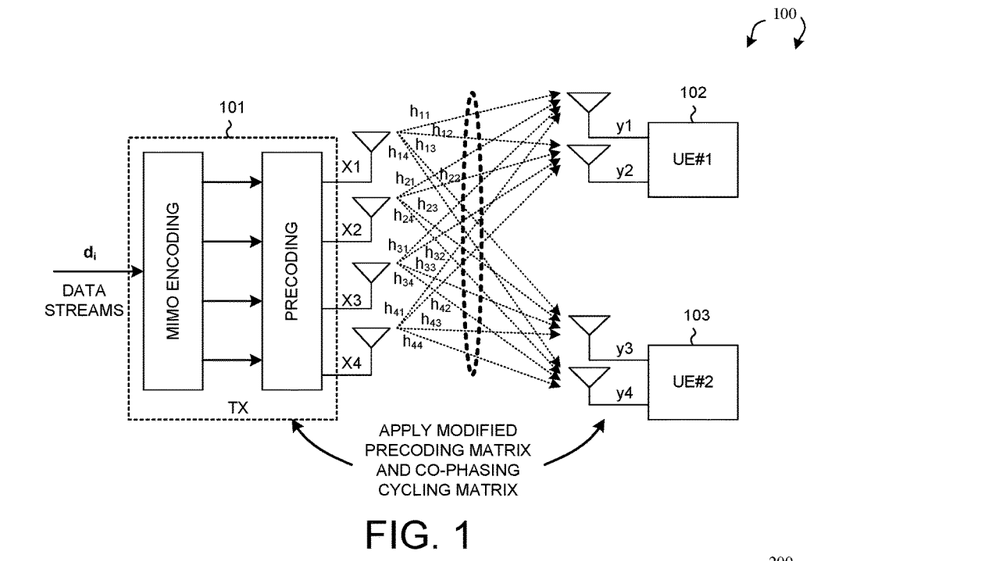
FIG. 1 illustrates a mobile communication network with MIMO precoding for two-layer UE-specific reference signal DMRS-based transmission mode in accordance with one novel aspect.

FIG. 1 illustrates a mobile communication network 100 with MIMO precoding for two-layer UE-specific reference signal DMRS-based transmission mode in accordance with one novel aspect. Mobile communication network 100 is an OFDM network comprising a serving base station eNB 101, a first user equipment 102 (UE#1), and a second user equipment 103 (UE#2). In 3GPP LTE system based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DMRS) are utilized by UEs for the demodulation of control/data channels in non-codebook-based precoded transmission modes.

Consider a multiple-input and multiple-output (MIMO) channel which models the downlink of the cellular mobile communication system 100. The BS is equipped with $N_t$ transmit antennas, and K UEs have $N_r$ receive antennas each. At a time-frequency resource element, the BS performs MIMO transmission over B spatial beams (B<=$N_t$) to L (L<=K) UEs by linear precoding. In the example of FIG. 1, four spatial streams are transmitted by the TX antennas with two spatial streams intended for each receiver. The coefficients $h_{11}$, $h_{12}$, $h_{13}$, and $h_{14}$ represent the transmission from $x_1$ antenna arriving at $y_1$, $y_2$, $y_3$, and $y_4$ antennas. The coefficients $h_{21}$, $h_{22}$, $h_{23}$, and $h_{24}$ represent the transmission from $x_2$ antenna arriving at $y_1$, $y_2$, $y_3$, and $y_4$ antennas. The coefficients $h_{31}$, $h_{32}$, $h_{33}$, and $h_{34}$ represent the transmission from $x_3$ antenna arriving at $y_1$, $y_2$, $y_3$, and $y_4$ antennas. Finally, the coefficients $h_{41}$, $h_{42}$, $h_{43}$, and $h_{44}$ represent the transmission from $x_4$ antenna arriving at $y_1$, $y_2$, $y_3$, and $y_4$ antennas. The transmission from each of the four TX antennas arrives at each of the four RX antennas. The received signal for two-layer (rank=2) spatial multiplexing transmission can be expressed as:

$$\underline{y}_i = H_i W_i \begin{bmatrix} d_{0,i} \\ d_{1,i} \end{bmatrix} + n_i$$

where
  i is the RE index
  $H_i$ is the channel response matrix
  $W_i$ is the precoding matrix
  $d_{0,i}$ is the layer-0 transmit signal
  $d_{1,i}$ is the layer-1 transmit signal
  $y_i$ is the received signal
  $n_i$ is the noise In LTE systems, a two-stage codebook has been defined for the precoding matrix. The precoding matrix to be applied to the data RE is equation (1) below, the precoding matrix on the demodulation reference signal (DMRS) which is transparent to the UE is equation (2), and the pre-defined matrix for co-phasing cycling for RE level processing becomes equation (3) below:

$$\frac{1}{\sqrt{2P}} \begin{bmatrix} v_{l,m} & 0 \\ 0 & v_{l,m} \end{bmatrix} \begin{bmatrix} 1 & 1 \\ \varphi_n & -\varphi_n \end{bmatrix} \quad (1)$$

$$\frac{1}{\sqrt{2P}} \begin{bmatrix} v_{l,m} & 0 \\ 0 & v_{l,m} \end{bmatrix} \quad (2)$$

$$\begin{bmatrix} 1 & 1 \\ \varphi_n & -\varphi_n \end{bmatrix} \varphi_n = e^{j\pi \mathrm{mod}(i,2)/2} \quad (3)$$

Where
  $P=2N_1N_2$ is defined as the number of CSI-RS ports, where $N_1$ and $N_2$ are the number of antenna ports with the same polarization in the first dimension and in the second dimension, respectively $v_{l,m}$ is defined as $$v_{l,m} = \left[u_m \ e^{j\frac{2\pi l}{O_1 N_1}} u_m \ \ldots \ e^{j\frac{2\pi l(N_1-1)}{O_1 N_1}} u_m\right]^T,$$

$$u_m = \left[1 \ e^{j\frac{2\pi m}{O_2 N_2}} \ \ldots \ e^{j\frac{2\pi m(N_2-1)}{O_2 N_2}}\right]$$

where l and m are the indexes for PMI codebook
$\varphi_n$ is defined as $$\varphi_n = e^{j\pi n/2}$$

where n is the index for co-phasing factor

LTE has defined different transmission mode (TM) for different transmission scenarios. For transmission mode 9 or 10, up to 8 layers transmission is supported with UE-specific demodulation reference signal (DMRS). For DMRS based TM, the UE maps assume the ratio of physical downlink share channel (PDSCH) energy per resource element (EPRE) to UE-specific RS EPRE within each OFDM symbol containing UE-specific RS is 0 dB for the number of transmission layers less than or equal to two. However, based on the precoding matrix on the data RE (equation (1)), and the precoding matrix on the reference signal (equation (2)), the PDSCH EPRE to UE-specific RS EPRE ratio is 3 dB, which violates the specification of 0 dB. Also, when the DMRS power is lower, it will impact the channel estimation performance at the receiver.

In accordance with one novel aspect, for two-layer (Rank=2) DMRS-based transmission scheme, the precoding matrix to be applied to the data RE is equivalently expressed by equation (4) below, the precoding matrix on the reference signal (RS) which is transparent to the UE becomes equation (5), and the pre-defined matrix for co-phasing cycling for RE level processing is modified to be equation (6) below, and:

$$\frac{1}{\sqrt{P}}\begin{bmatrix} v_{l,m} & 0 \\ 0 & v_{l,m} \end{bmatrix} \frac{1}{\sqrt{2}}\begin{bmatrix} 1 & 1 \\ \varphi_n & -\varphi_n \end{bmatrix} \quad (4)$$

$$\frac{1}{\sqrt{P}}\begin{bmatrix} v_{l,m} & 0 \\ 0 & v_{l,m} \end{bmatrix} \quad (5)$$

$$\frac{1}{\sqrt{2}}\begin{bmatrix} 1 & 1 \\ \varphi_n & -\varphi_n \end{bmatrix} \quad \varphi_n = e^{j\pi \bmod(i,2)/2} \quad (6)$$

Where
$P = 2N_1 N_2$ is defined as the number of CSI-RS ports, where $N_1$ and $N_2$ are the number of antenna ports with the same polarization in the first dimension and in the second dimension, respectively
$v_{l,m}$ is defined as $$v_{l,m} = \left[u_m \ e^{j\frac{2\pi l}{O_1 N_1}} u_m \ \ldots \ e^{j\frac{2\pi l(N_1-1)}{O_1 N_1}} u_m\right]^T,$$

$$u_m = \left[1 \ e^{j\frac{2\pi m}{O_2 N_2}} \ \ldots \ e^{j\frac{2\pi m(N_2-1)}{O_2 N_2}}\right]$$

where l and m are the indexes for PMI codebook
$\varphi_n$ is defined as $$\varphi_n = e^{j\pi n/2}$$

where n is the index for co-phasing factor

By applying the proposed co-phasing cycling matrix (equation (6)) for Rank=2 DMRS-based transmission scheme, the ratio of PDSCH EPRE to UE-specific RS EPRE is equal to 0 dB, as required by the LTE specification. Further, when the DMRS power is higher (equation (5)), channel estimation performance can be improved.

Figure 2:
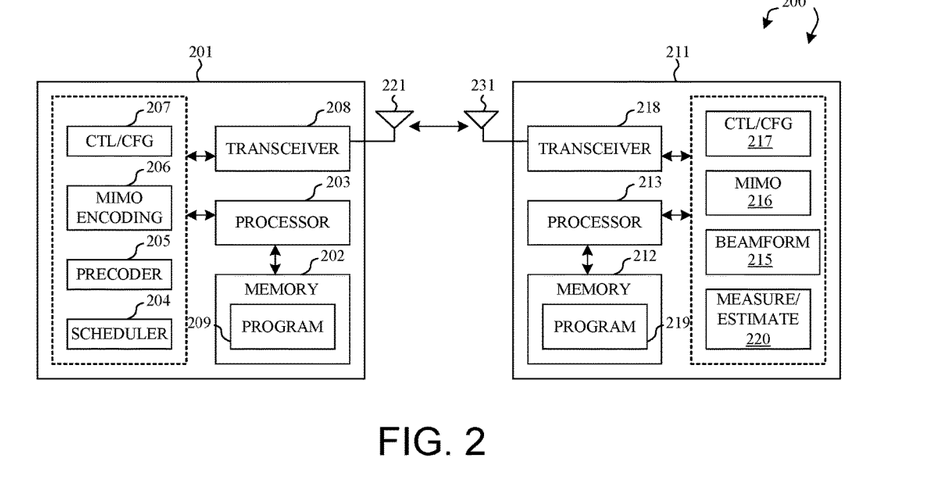
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules and circuits, when executed by the processors 203 and 213 (e.g., via executing program codes 209 and 219), for example, allow base station 201 to schedule (via scheduler 204), precode (via precoder 205), encode (via MIMO encoding circuit 206), and transmit control/config information and data (via control/config circuit 207) to UE 211, and allow UE 211 to receive, decode (via MIMO circuit 216), and beamform (via beamforming circuit 215) the control/config information and data (via control/config circuit 217) and performs channel estimation (via measurement/estimation circuit 220) accordingly. In one example, base station 201 applies the proposed co-phasing cycling matrix (equation (6)) for Rank=2 DMRS-based transmission scheme, the ratio of PDSCH EPRE to UE-specific RS EPRE is equal to 0 dB, as required by the LTE specification. Further, when the DMRS power is higher (equation (5)), channel estimation performance can be improved.

Figure 3:
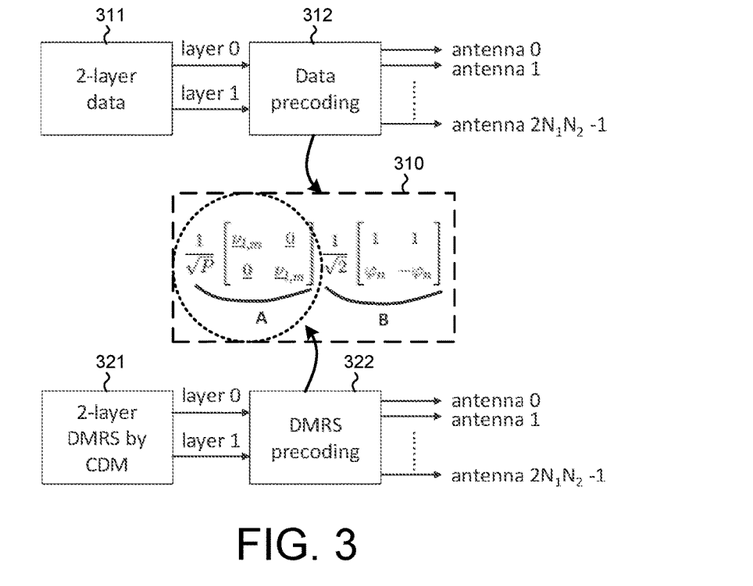
FIG. 3 illustrates a downlink MIMO transmission procedure using DMRS transmission mode from BS perspective in accordance with one novel aspect.

FIG. 3 illustrates a downlink MIMO transmission procedure using DMRS transmission mode from a base station perspective in accordance with one novel aspect. FIG. 3 depicts both data precoding and reference signal precoding. For data precoding, in step 311, the BS generates two-layer data from the input signal through MIMO encoding. Both layer-0 and layer-1 data are then precoded by a data precoding matrix in step 312, the precoded data is then transmitted to UE via a two-dimensional antenna array comprising a plurality of antennas 0 to $2N_1 N_2 - 1$. The data precoding matrix is depicted by 310, e.g., represented by equation (4). The data precoding matrix can be written as A×B, where A is a $2N_1 N_2$ matrix (equation (5)), and B is a 2×2 matrix (equation (6)). In a precoding resource block group (PRG), each RE applies the same matrix A, and matrix B is changed per RE based on the RE index. Matrix B is also referred to as the co-phasing cycling matrix, and is specified for each RE index.

For UE-specific reference signal DMRS precoding, in step 321, the BS generates two-layer DMRS using code division multiplexing (CDM). Both layer-0 and layer-1 DMRS are then precoded by a DMRS precoding matrix in step 322, the precoded DMRS is then transmitted to UE via a two-dimensional antenna array comprising a plurality of antennas 0 to $2N_1N_2-1$. The DMRS precoding matrix can be written as A (equation (5)), which is the same as the A in data precoding. In a PRG, each RE applies the same matrix A for DMRS precoding.

Figure 4:
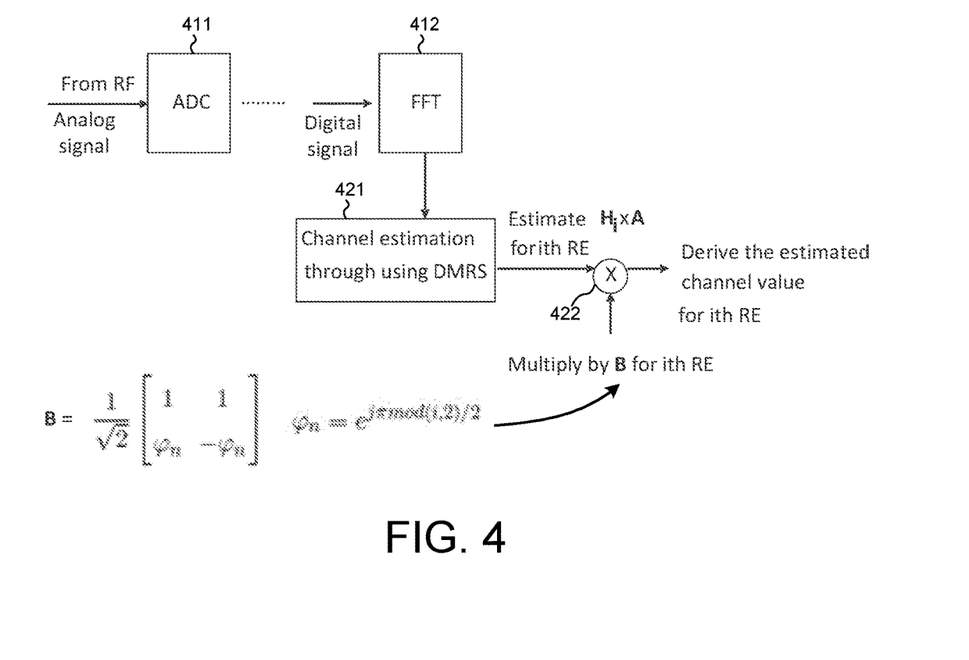
FIG. 4 illustrates a downlink MIMO transmission procedure using DMRS transmission mode from UE perspective in accordance with one novel aspect.

FIG. 4 illustrates a downlink MIMO transmission procedure using DMRS transmission mode from a user equipment (UE) perspective in accordance with one novel aspect. The UE receives downlink scheduling from its serving BS for downlink data transmission, where UE-specific reference signal DMRS is transmitted on predefined REs, and data signal is transmitted on remaining scheduled REs. In step 411, the UE receives analog signal from its RF module and converts to digital signal by an analog-to-digital converter (ADC) circuit. In step 412, the digital signal is processed by a Fast Fourier Transform (FFT) processing circuit. In step 421, the UE performs channel estimation through the use of DMRS. Specifically, for each DMRS RE, the UE estimates $H_i \times A$ for $i^{th}$ RE. In step 422, the UE further derives the estimated channel value for the $i^{th}$ RE by multiplying B, and B is the co-phasing cycling matrix that is represented by equation (6). Note that the equivalent channel observed from each DMRS in a PRG is $H_k \times A$, whose dimension is $N_r \times 2$, where $N_r$ is the UE receive antenna number, and $H_k$ is the channel response matrix for the $k^{th}$ DMRS.

Figure 5:
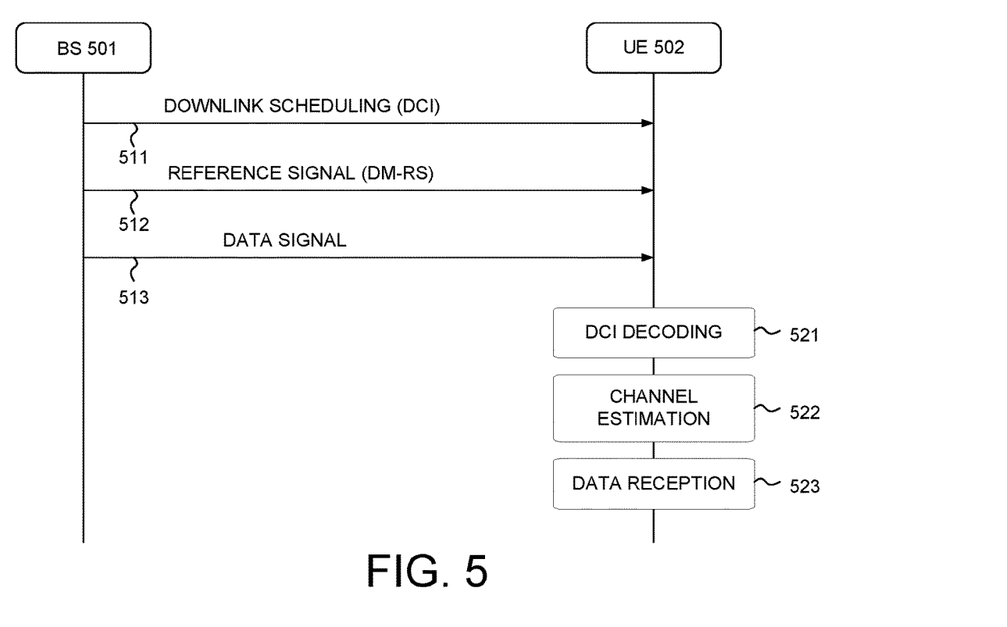
FIG. 5 illustrates a sequence flow of DMRS-based transmission scheme for two-layer (rank=2) spatial multiplexing transmission.

FIG. 5 illustrates a sequence flow of DMRS-based transmission scheme for two-layer (rank=2) MIMO spatial multiplexing transmission. In step 511, BS 501 transmits downlink scheduling information to UE 502. The downlink scheduling information comprises downlink control information (DCI) over candidate PDCCHs for the corresponding downlink transmission over PDSCH. The DCI in different formats are coupled with different transmission modes and resource allocation types in the downlink. In step 512, BS 501 transmits UE-specific reference signal DMRS to UE 502 on predefined REs. The DMRS is applied with precoding matrix A. In step 513, BS 501 transmits data signal to UE 502 on remaining scheduled REs. The data signal is applied with precoding matrix A×B. Note that the DCI, DMRS, and data signal can be transmitted in the same downlink transmission, but over different resource locations. In step 521, UE 502 receives the downlink transmission and performs channel estimation through the use of DMRS. Specifically, UE 502 estimates the channel $H_i \times A$ for $i^{th}$ RE. In step 522, UE 502 further derives the data signal by multiplying the predefined co-phasing cycling matrix B for $i^{th}$ RE. Note that the transmit power for DMRS under the proposed precoding is raised by a factor of $\sqrt{2}$. Furthermore, the co-phasing cycling matrix for data RE under the proposed precoding is scaled by a factor of $1/\sqrt{2}$. As a result, the radio of an EPRE of data over PDSCH to an EPRE of DMRS is equal to 0 dB, which satisfies the LTE specification.

Figure 6:
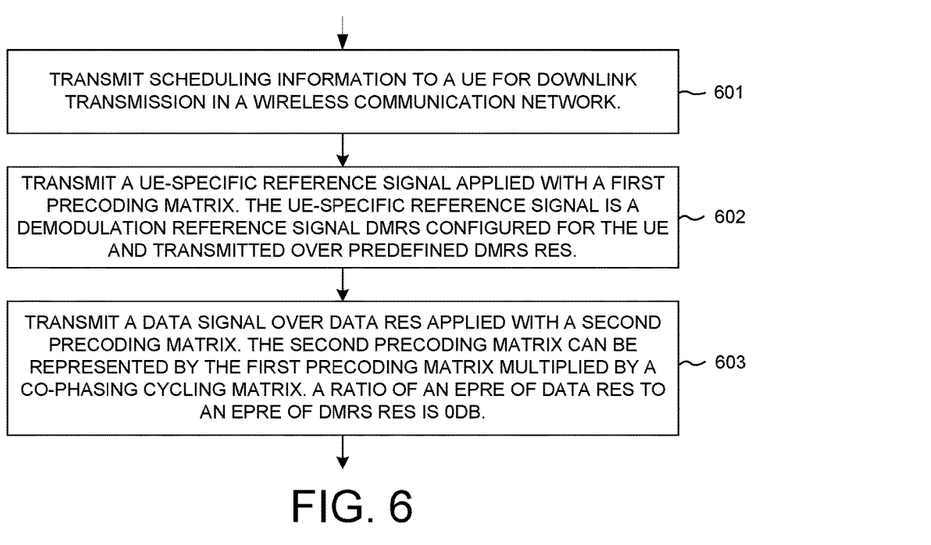
FIG. 6 is a flow chart of a precoding method of two-layer DMRS-based transmission from BS perspective in accordance with one novel aspect.

FIG. 6 is a flow chart of a precoding method of two-layer DMRS-based transmission from BS perspective in accordance with one novel aspect. In step 601, a BS transmits scheduling information to a user equipment (UE) for downlink transmission in a wireless communication network. In step 602, the BS transmits a UE-specific reference signal applied with a first precoding matrix, wherein the UE-specific resource signal is a demodulation reference signal (DMRS) configured for the UE and transmitted over predefined DMRS resource elements (REs). In step 603, the BS transmits a data signal over data REs applied with a second precoding matrix, wherein the second precoding matrix can be represented by the first precoding matrix multiplied by a co-phasing cycling matrix, and wherein a ratio of an energy per resource element (EPRE) of data REs to an EPRE of the DMRS REs is 0 dB.

Figure 7:
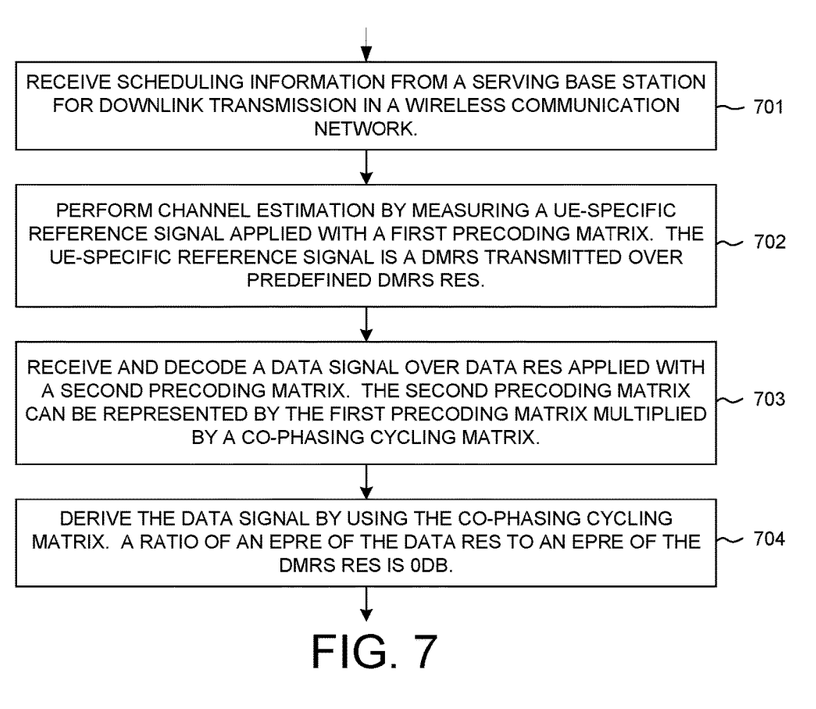
FIG. 7 is a flow chart of a precoding method of two-layer DMRS-based transmission from UE perspective in accordance with one novel aspect.

FIG. 7 is a flow chart of a precoding method of two-layer DMRS-based transmission from UE perspective in accordance with one novel aspect. In step 701, a UE receiving scheduling information from a serving base station for downlink transmission in a wireless communication network. In step 702, the UE performs channel estimation by measuring a UE-specific reference signal applied with a first precoding matrix, wherein the UE-specific resource signal is a demodulation reference signal (DMRS) transmitted over predefined DMRS resource elements (REs). In step 703, the UE receives and decodes a data signal over data REs applied with a second precoding matrix. The second precoding matrix can be represented by the first precoding matrix multiplied by a co-phasing cycling matrix. In step 704, the UE derives the data signal by using the co-phasing cycling matrix, wherein a ratio of an energy per resource element (EPRE) of the data REs to an EPRE of the DMRS REs is 0 dB.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   transmitting scheduling information from a serving base station to a user equipment (UE) for downlink transmission in a wireless communication network;
   transmitting a UE-specific reference signal applied with a first precoding matrix, wherein the UE-specific resource signal is a demodulation reference signal (DMRS) configured for the UE and transmitted over predefined DMRS resource elements (REs); and
   transmitting a data signal over data REs applied with a second precoding matrix, wherein the second precoding matrix can be represented by the first precoding matrix multiplied by a co-phasing cycling matrix, and wherein a ratio of an energy per resource element (EPRE) of data REs to an EPRE of the DMRS REs is 0 dB.

2. The method of claim 1, wherein the scheduling information is carried by a physical downlink control channel (PDCCH).

3. The method of claim 1, wherein the base station increases a transmit power of the DMRS REs through the first precoding matrix such that UE channel estimation performance is improved.

4. The method of claim 3, wherein the first precoding matrix is defined in a codebook and scaled by a factor of $1/\sqrt{P}$ and wherein P is defined as a number of ports for reference signals.

5. The method of claim 1, wherein the co-phasing cycling matrix is predefined for each data RE based on a corresponding data RE index.

6. The method of claim 5, wherein the co-phasing cycling matrix is a 2×2 matrix having co-phasing factor elements, and wherein the co-phasing cycling matrix is scaled by a factor of $1/\sqrt{2}$.

7. A method comprising:
   receiving scheduling information from a serving base station by a user equipment (UE) for downlink transmission in a wireless communication network;
   performing channel estimation by measuring a UE-specific reference signal applied with a first precoding matrix, wherein the UE-specific resource signal is a demodulation reference signal (DMRS) transmitted over predefined DMRS resource elements (REs);
   decoding a data signal over data REs applied with a second precoding matrix, wherein the second precoding matrix can be represented by the first precoding matrix multiplied by a co-phasing cycling matrix; and
   deriving the data signal by using the co-phasing cycling matrix, wherein a ratio of an energy per resource element (EPRE) of the data REs to an EPRE of the DMRS REs is 0 dB.

8. The method of claim 7, wherein the scheduling information is carried by a physical downlink control channel (PDCCH).

9. The method of claim 7, wherein the UE improves channel estimation performance when the DMRS is transmitted with an increased power through the first precoding matrix.

10. The method of claim 9, wherein the first precoding matrix is defined in a codebook and scaled by a factor of $1/\sqrt{P}$, and wherein P is defined as a number of ports for reference signals.

11. The method of claim 7, wherein the co-phasing cycling matrix is predefined for each data RE based on a corresponding data RE index.

12. The method of claim 11, wherein the co-phasing cycling matrix is a two-by-two matrix having co-phasing factor elements, and wherein the co-phasing cycling matrix is scaled by a factor of $1/\sqrt{2}$.

13. The method of claim 7, wherein the downlink transmission is a two-layer transmission with spatial multiplexing.

14. A User Equipment (UE) comprising:
   a radio frequency (RF) receiver that receives scheduling information from a serving base station for downlink transmission in a wireless communication network;
   a channel estimation circuit that performs channel estimation by measuring a UE-specific reference signal applied with a first precoding matrix, wherein the UE-specific resource signal is a demodulation reference signal (DMRS) transmitted over predefined DMRS resource elements (REs); and
   a decoder that decodes a data signal over data REs applied with a second precoding matrix, wherein the second precoding matrix can be represented by the first precoding matrix multiplied by a co-phasing cycling matrix, and wherein the data signal is derived by using the co-phasing cycling matrix such that a ratio of an energy per resource element (EPRE) of the data REs to an EPRE of the DMRS REs is 0 dB.

15. The UE of claim 14, wherein the scheduling information is carried by a physical downlink control channel (PDCCH).

16. The UE of claim 14, wherein the UE improves channel estimation performance when the DMRS is transmitted with an increased power through the first precoding matrix.

17. The UE of claim 16, wherein the first precoding matrix is defined in a codebook and scaled by a factor of $1/\sqrt{P}$, and wherein P is defined as a number of ports for reference signals.

18. The UE of claim 14, wherein the co-phasing cycling matrix is predefined for each data RE based on a corresponding data RE index.

19. The UE of claim 18, wherein the co-phasing cycling matrix is a two-by-two matrix having co-phasing factor elements, and wherein the co-phasing cycling matrix is scaled by a factor of $1/\sqrt{2}$.

20. The UE of claim 14, wherein the downlink transmission is a two-layer transmission with spatial multiplexing.

* * * * *